June 8, 1937.  C. D. GRASSLE  2,083,329
FISH HOLDER
Filed June 29, 1936
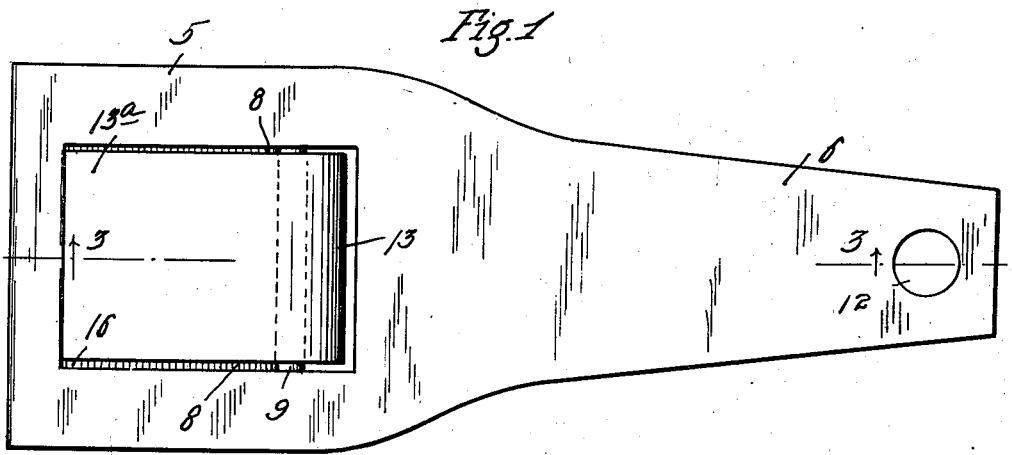
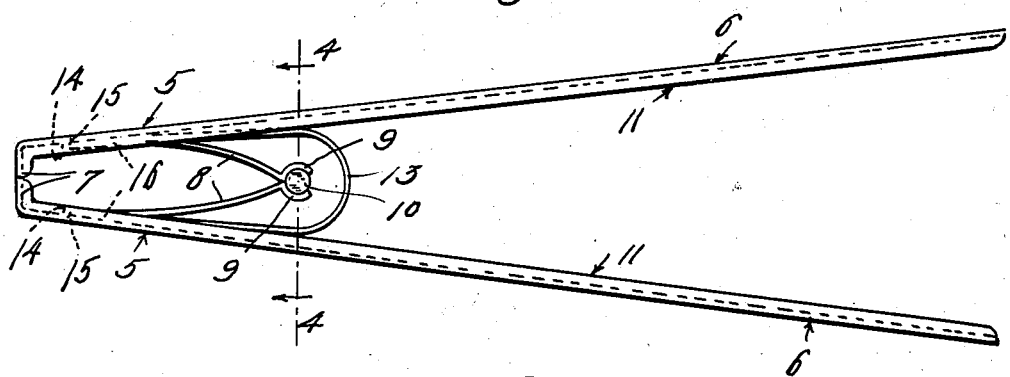
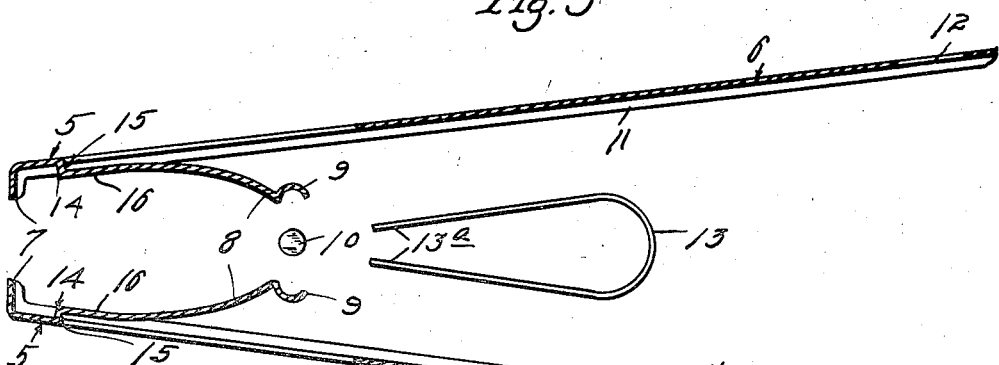
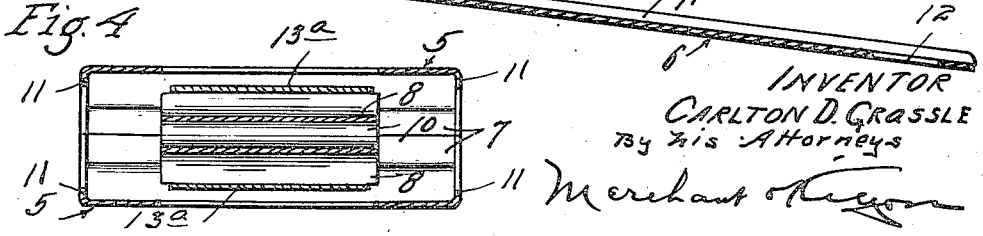
INVENTOR
CARLTON D. GRASSLE
By his Attorneys Patented June 8, 1937

2,083,329

UNITED STATES PATENT OFFICE 2,083,329

FISH HOLDER

Carlton D. Grassle, Rochester, Minn.

Application June 29, 1936, Serial No. 87,924

3 Claims. (Cl. 17—8)

My invention relates to a device for holding fish during the scaling operation and is in the nature of a plier-like structure for securely gripping the tail of the fish.

Because of the slippery nature of fish in general, I have found it extremely difficult, when removing the scales, to get a good grip upon the fish and to prevent it from sliding around. This makes removal of the scales very difficult. I have, therefore, provided a device capable of securely gripping the tail of the fish and holding the fish free from movement in the direction of the force exerted to remove the scales.

I have illustrated the device in the accompanying drawing, wherein like characters indicate like parts throughout the several views.

Referring to the drawing:

Fig. 1 is a plan view of the assembled plier-like holder;

Fig. 2 is a side elevation of the same;

Fig. 3 is a horizontal section taken on the line 3—3 of Fig. 1, the parts being separated and some parts being shown in full; and Fig. 4 is a transverse section taken on the line 4—4 of Fig. 2.

My device is composed of two identical one-piece sheet metal levers 5 having reduced handle portions 6, inwardly pressed jaws 7, and inwardly pressed wings 8. Each of the free ends of the wings 8 is bent at 9 to conform to the peripheral surface of a pivot pin 10.

For the purpose of rigidity, the outside edges of each lever 5 is provided with inwardly pressed longitudinal flanges 11. Near the end of each handle portion 6 each of the levers 5 is provided with a hole 12, for a purpose which will hereinafter be more fully explained. A U-shaped spring 13 is shown as provided with converging ends 13a.

Adjacent to the jaws 7, wings 8 are shown as abruptly depressed at 14 from the main body portion of the levers 5 so as to provide an abutment 15 for the ends 13a of U-shaped spring 13. The numeral 16 indicates that portion of the depressed wings 8 which runs parallel to levers 5.

The manufacture and assembly of this device is extremely simple. Inasmuch as each of the opposing levers 5 is, in all respects, identical, they can be pressed from the same die. To assemble the device, two of the opposing levers 5 are put face to face, as indicated in Fig. 3, and pivot pin 10 is inserted between the rounded open ends 9 of the depressed wings 8. To hold the structure in this assembled position, U-spring 13 is forced over the outside surfaces of wings 8 until the converging ends 13a come to rest against the abutment 15.

It is now obvious that inasmuch as the converging ends 13a of the U-spring 13 exert a pinching action upon the jaws 7, that the open rounded ends 9 of the wings 8 will frictionally and securely embrace the pivot pin 10. At all times sufficient force will be exerted upon pivot pin 10 by the wings 8 to prevent said pivot pin from falling out. When in use, or when in an open position, it is obvious that the entire pinching action of the U-spring 13 is brought to bear upon the pivot pin 10 by the wings 8.

The use of this device in the scaling operation is also extremely simple. The jaws 7 are opened sufficiently to grip the tail of the fish by bringing pressure to bear upon the handles 6 of the levers 5. If a horizontal board is to be used as a surface upon which the fish is scaled and cleaned, then the fish and device may be laid out flat and a nail or the like inserted in the hole 12 in the handle 6 to keep the fish in position. When one side of the fish is completely scaled the fish and device may be turned over and the nail inserted through the opposite handle at hole 12. Of course, the device could be hung from a vertical post or the like if one is desirous of scaling the fish while it is hung from that position.

It is important to observe the ease with which this device can be taken apart. This is obviously accomplished merely by pulling U-spring 13 rearwardly and out of engagement with the wings 8. Once the device is taken apart, it can be packed in a very small space.

From the above description it is evident that the device is capable of various modifications within the scope of the invention herein disclosed and claimed.

What I claim is:

1. A device of the kind described having identical sheet metal levers, a pivot pin, and a U-shaped clasping spring, said sheet metal levers having inwardly pressed rearwardly extending wings adapted to frictionally engage said pivot pin, and said U-shaped spring being adapted to frictionally engage the outside surface of said wings to clasp said levers together for pivotal movement on the pivot pin.

2. The structure defined in claim 1 in which said wings join the main body portion of the levers adjacent the jaws.

3. A device of the kind described comprising similar levers having gripping ends and inwardly projecting wings, said wings having pivotal contact at their inner ends, and a U-shaped spring embracing the said wings and yieldingly pressing together the gripping ends of the levers.

CARLTON D. GRASSLE.